United States Patent [19]

Garrett et al.

[11] Patent Number: 4,893,930
[45] Date of Patent: Jan. 16, 1990

[54] MULTIPLE AXIS, FIBER OPTIC INTERFEROMETRIC SEISMIC SENSOR

[75] Inventors: Steven L. Garrett, Pebble Beach; David L. Gardner, Monterey, both of Calif.

[73] Assignee: The United States of America as represented by the Secretary of the Navy, Washington, D.C.

[21] Appl. No.: 147,968

[22] Filed: Jan. 25, 1988

[51] Int. Cl.$^4$ .................................. G01B 9/02
[52] U.S. Cl. .................. 356/345; 250/227; 367/149
[58] Field of Search .............. 356/345; 250/227; 73/517 R, 655, 657; 367/149

[56] References Cited

U.S. PATENT DOCUMENTS

| | | | |
|---|---|---|---|
| 3,094,864 | 6/1963 | Kahkonen et al. | 73/517 R X |
| 3,468,167 | 9/1969 | Klass et al. | 73/517 R X |
| 4,322,829 | 3/1982 | Davis, Jr. et al. | 367/149 X |
| 4,534,222 | 8/1985 | Finch et al. | 356/345 X |
| 4,613,752 | 9/1986 | Davis | 250/227 |
| 4,799,752 | 1/1989 | Carome | 356/345 X |

OTHER PUBLICATIONS

Kersey et al. "High-Sensitivity Fibre-optic Accelerometer", *Electronics Letters*, vol. 18, No. 13, pp. 559–561, 6/82.

G. B. Mills, S. L. Garrett, and E. F. Carome; "Fiber optic gradient hydrophone":, *Proceedings of SPIE* (Society of Phot-Optical Instrumentation Engineers); vol. 478, pp. 98–103; May 1–2, 1984; Bellingham, Washington.

*Primary Examiner*—Davis L. Willis
*Assistant Examiner*—Matthew W. Koren
*Attorney, Agent, or Firm*—Sol Sheinbein; Melvin J. Sliwka; Stephen J. Church

[57] ABSTRACT

A mechanical vibration transducer includes a seismic mass is supported by a plurality of cylindrical silicone rubber mandrels. Each mandrel is wound with a length of optical fiber which has a reflective end and a transmissive end. A case surrounds the assemblage and is connected to the supports. When the case is displaced, the supports change diameter in response to the relative motion between the seismic mass and the case. This change in diameter is translated to a change in length of the optical fiber. By using the fibers as arms of a michelson interferometer, a sensitive instrument responsive to displacing vibrations is obtained. This instrument is energized entirely by light transmitted through optical fiber waveguides and whose information is transmitted to the observor using only light . waves in optical fibers.

3 Claims, 2 Drawing Sheets

MULTIPLE AXIS, FIBER OPTIC INTERFEROMETRIC SEISMIC SENSOR

BACKGROUND OF THE INVENTION

1. Field of the Invention

This invention relates to the field of vibration Analysis.

More particularly, this invention relates to transducers to detect and produce optical representations of vibrational energy.

In still greater particularity, but without limitation thereto the invention will be described as it pertains to an interferometric vibration sensor.

2. Description of the Prior Art

Much of the initial enthusiasm surrounding the application of optical fiber technology to sensor systems was generated by the potential for high sensitivity using interferometry and the possibility of constructing a completely optical system which takes advantage of fiber optic telemetry. The need for parallel electrical systems to electrical systems to power and condition the electronic outputs of the vibration sensors is thereby eliminated. The promise of high sensitivity was not based on the intrinsic sensitivity of optical fibers to physical stimuli but on the fact that existing demodulators can resolve optical phase shifts on the order of microradians. Additionally, optical path lengths of tens or hundreds of meters could be incorporated in sensors of modest physical dimensions. The combination of high interferometric demodulator resolution and long optical path length led to the possibility of displacement measurements with resolutions on the order of a part in $10^{11}$ to $10^{14}$. In addition to measurement of conventional physical parameters such as temperature, pressure, etc., fiber optic sensors were suggested for such unusual measurements as the detection of cosmologically generated gravitational waves.

With time it became apparent that such high sensitivities might not lead to practical devices since microradian optical interferometric demodulators were not easy to produce outside the laboratory. In addition, the optical fiber was found to be as sensitive to other extraneous physical parameters as it was to the parameter it was designed to detect. The concomitant optical phase shift resulting from extraneous parameters made it difficult to stabilize a "reference fiber" in one arm of a conventional interferometer against fluctuations in ambient conditions such as temperature, static pressure, accelerations, etc.

OBJECTS OF THE INVENTION

It is an object of this invention to provide an improved vibration sensor.

A further object of this invention is the provision of vibration sensor using optical fiber sensors.

Yet another object of the present invention is the provision of a sensitive construction technique permitting optical fibers to respond to externally applied vibrational energies.

These and other objects of the invention will become apparent to skilled artisans who read the following specification with reference to the attached illustrations which are a part thereof and in which:

DESCRIPTION OF THE PREFERRED EMBODIMENT

Figure 1:
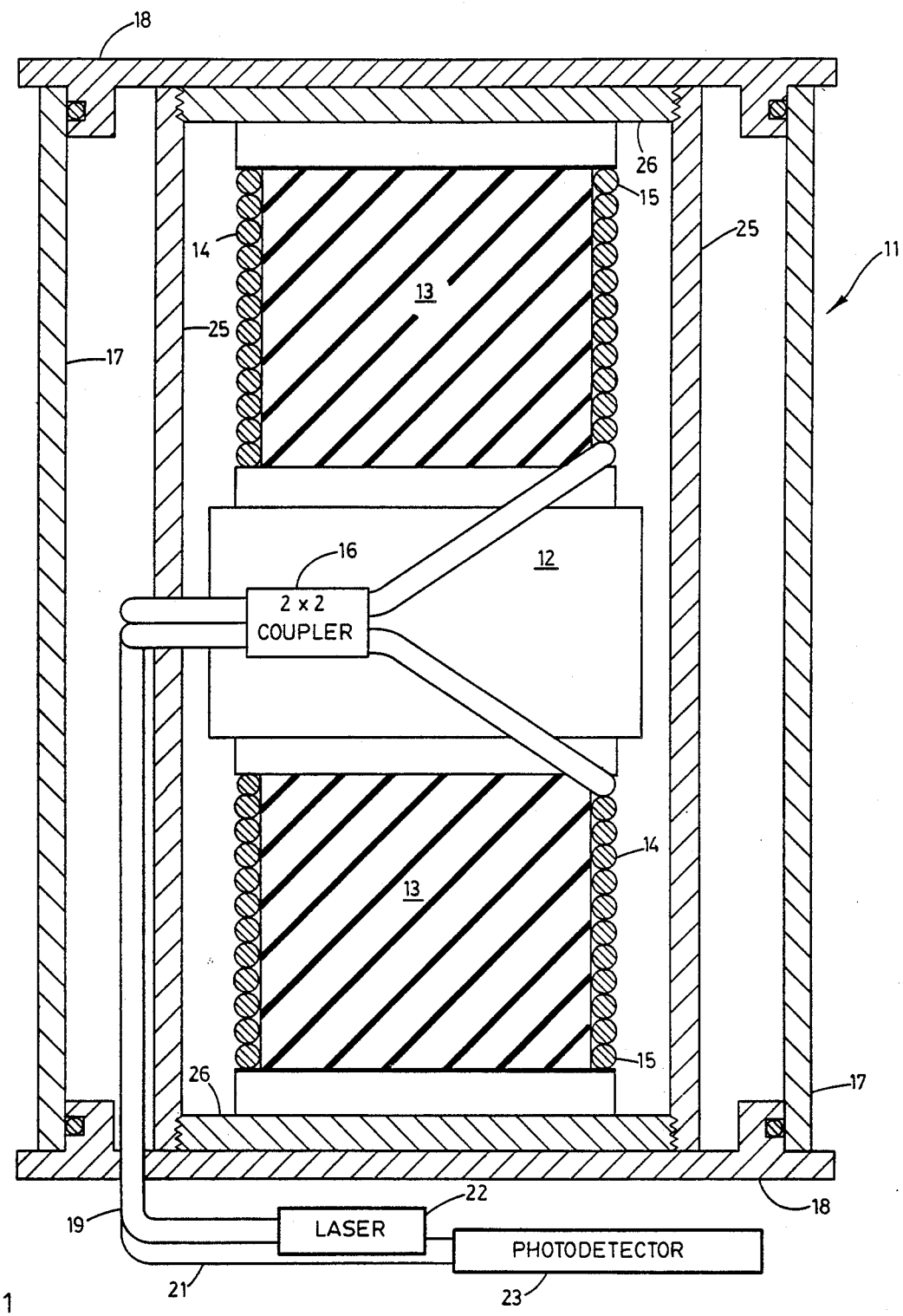
FIG. 1 is a simplified illustration of the invention.

Before describing the construction of the invention, a brief discussion of the basics of the field are in order. Sensors used for the measurement of mechanical motion (eg. displacement, velocity, or acceleration) with respect to some fixed point in space are known as fixed reference instruments. In many applications a fixed reference is not available and a simple mass-spring system is used which exploits the inertial properties of the mass to act as the reference for some strain measuring transducer. The output of the transducer can be interpreted via simple physical models to deduce mechanical motion. In these conventional vibration sensors the strain is usually detected by a piezoelectric or piezoresistive element, as is common with accelerometers. A capacitor or inductive displacement sensing element is common in seismometers, and electrodynamic displacement rate transducers are common in geophones. Such inertial instruments based on simple harmonic oscillators are called seismic transducers. Those instruments detecting the strain of the sensing element may be characterized as strain gages.

While the function of a strain gage is relatively simple, in that a change in the length of the sensing element is converted into an electronic signal, the distinction between seismometers (displacement sensors), accelerometers, and geophones (velocity sensors) is frequency dependent. For sinusoidal excitation, the parameters measured by these three devices are related by various integer powers of frequency, for instance.

$$a(t) = -\omega \chi(t) \tag{1}$$

Where:
$\omega$ = radian frequency
$a$ = acceleration
$\chi$ = displacement

The devices are similar in that each is fundamentally a simple harmonic oscillator system, and are distinguished by their frequency range of operation. The response of this generic seismic instrument is:

$$\frac{\delta_0}{\chi_0} = \frac{\left(\frac{\omega}{\omega_n}\right)^2}{\sqrt{\left[1 - \left(\frac{\omega}{\omega_n}\right)^2\right]^2 + \left(2\xi\frac{\omega}{\omega_n}\right)^2}} \tag{2}$$

where:
$\delta$ = relative displacement between the seismic mass and case
$\xi$ = damping ratio
$\omega_n$ = natural frequency = $(\kappa/m)^{\frac{1}{2}}$
$\kappa$ = stiffness constant
m = seismic mass Variables with the subscript zero are the peak values of the quantity that is assumed to be varying sinusoidally. Assuming small damping ($\xi << 1$), at frequencies well above resonance, or $\omega >> \omega_n$, the mass is nearly stationary with respect to an inertial reference frame. The relative displacement of the case and seismic mass, $\delta_0$ is independent of frequency.

Using equation (1), equation (2) can be written as, $$\frac{\delta_0}{a_0} = -\frac{1}{\omega_n^2}\left[\frac{1}{\sqrt{\left[1-\left(\frac{\omega}{\omega_n}\right)^2\right]^2 + \left(2\xi\frac{\omega}{\omega_n}\right)^2}}\right] \quad (3)$$

At frequencies below resonance, $\omega << \omega_n$, $\delta_0$ becomes a measure of the acceleration, with sensitivity which is inversely proportional to the square of the natural frequency or directly proportional to the seismic mass, M, and inversely proportional to the stiffness constant, $\kappa$.

The geophone, which measures the velocity of the foundation, can be constructed to operate in either of the two regimes described above by appropriate electronic differentiation or integration of the strain gage output. However, a common means of constructing a conventional geophone is to attach to the foundation a wire coil which moves within a suspended magnetic seismic mass, so that the voltage generated by their relative motion is directly proportional to the velocity. In an interferometric optical seismometer, geophone operation can be produced by processing the optical signal as a fringe rate for operation above resonance.

Referring to the FIG. 1, a mechanical energy transducer, eg. a seismometer, is illustrated. For reasons which will be addressed in detail, the sensor, shown at 11, comprises two fiber-wrapped rubber mandrels or springs 13 which support a seismic mass 12. A length of fiber 14 wrapped about each spring 13 has an input/output end attached to a bi-directional optical coupler 16 and a distal end 15 which is reflective. An enclosure 17 surrounds springs 13, optical fibers 14, bi-directional optical coupler 16, and seismic mass 12. Enclosure 17 has end caps 18 which attach to and support springs 13 and mass 12 therebetween. In some of the development models, the bi-directional optical, coupler 16, was separate from enclosure 17. A laser light source 22 and conventional optical interferometric detector 23 complete the instrument.

If desired, springs 13 may be preloaded to a desired compression range. A system for accomplishing this preload is shown in the figure. An inner, case 25 receives a threaded end cap 26 in opposite ends thereof. End caps 26 contact springs 13 such that a compressional force is applied thereto as their relative position is adjusted.

Springs 13 supporting seismic mass 12 are right circular cylinders fabricated from soft silicone rubber mandrels, each wrapped circumferentially with optical fiber 14 acting as one arm of the optical fiber interferometer. The function of rubber spring mandrels 13 is to transform relative longitudinal motion between the case and mass into fiber strain. When operated in the seismometer limit, $\omega >> \omega_n$, mass 12 remains approximately stationary as the enclosure 17 moves. The relative motion between enclosure 17 and mass 12 forces one of the mandrels to shorten and the other to lengthen, in a push-pull configuration. The rubber from which springs 13 are formed is effectively incompressible. Since the volume of the rubber is conserved, a change in height of the mandrel induces a change in circumference. Each optical fiber 14 is individually wrapped around each mandrel 13 under tension and thus will respond to both, increases and decreases in mandrel circumference. The push-pull effect is one reason for the seismometer's high sensitivity. Its sensitivity is further enhanced since the bi-directional optical coupler 16 places the optical fibers 14 in the Michelson configuration for the interferometer (the light passes through each sensor coil twice due to the distal end 15 of each fiber 14 being reflective).

The sensitivity of sensor 11 to transverse motion in principle is zero if the displacement sensitivity of the two mandrels is identical. A displacement which is orthogonal to the sensor axis causes both mandrels 13 to be extended by the same amount hence generating no optical path length difference. If the displacement sensitivity of the individual mandrels 13 is not identical, transverse displacement will generate a signal at twice the displacement frequency and proportional to the sensitivity difference of the two mandrels multiplied by a small quantity which is second order in the orthogonal displacement.

While the length of the individual interferometer arms must be identical to within the coherence length of the light source in order to produce good fringe visibility, there are no similar constraints on the transmission fibers 19 and 21 which are on the opposite side of the bi-directional optical coupler 16 and provide light to the sensor and return the modulated interferometer signal. The sensor can thus exploit existing fiber optic communications technologies to bring light to the sensor and return the signal to the photodetector without noise in these fibers contributing to the seismically induced phase shifts. This arrangement ensures that electro-optical conversion can occur at the observer location, even for very large sensor-receiver separation distances.

The rubber mandrels used in the experiments reported here were cast from two materials, one Eccosil TM 2CN, a registered Trademark of Emerson & Cumming of Canton, Mass having an effective Young's modulus of $3.9 \times 10^6$ dynes/cm$^2$ and the other Eccosil TM 5019, a registered Trademark of the same source, having an effective Young's modulus of $1.2 \times 10^7$ dynes/cm$^2$. Both materials were mixed and degassed before being poured into molds and cured at 60° C. to reduce curing time. The effective spring constant of a fully wrapped mandrel is calculated by assuming that the elastic energy stored by the deformation of the mandrels can be expressed in two different, but equivalent, forms. The first form is an expression for the stored elastic energy in the optical fiber, and the second is for energy stored in the mandrel proper when treated as a spring.

The stiffness of the fiber is length dependent, in that, given equal fiber extension, a long piece of fiber experiences less strain than does a short piece of fiber. Therefore, the stiffness of the fiber is inversely proportional to its length and can be written as, $$K_i = \frac{K_{in}}{N\pi D} \quad (4)$$

Where:
$\kappa_{fn}$ = stiffness of one unit length of optical fiber (the stiffness- length product)
$\kappa_f$ = effective fiber stiffness
$N\pi D$ = total fiber length
N = number of circumferential wraps of fiber
D = mandrell diameter The total fiber energy, $E_f$, is, $$E_i = \frac{1}{2} \frac{K_{in}}{N\pi D} (\delta L)^2 \quad (5)$$

where $\delta L = N\pi\delta D$, the fiber extension.

The equation for the total potential energy stored in the fiber wrapped portion of the mandrel is, $$E_i = \frac{K_{in}}{2N\pi D}(N\pi \delta D)^2, \text{ or, } E_i = \frac{N\pi K_{in}}{2D}(\delta D)^2 \quad (6)$$

The potential energy stored in the mandrel can similarly be written as a function of mandrel stiffness, in that a change in mandrel height results in the same energy being stored. Recalling the assumption of volume conservation, $$V = \frac{\pi D^2 h}{4}, \therefore -\frac{2\delta D}{D} = \frac{\delta h}{h}, \text{ or } \delta h = -\frac{2h\delta D}{D} \quad (7)$$

where h=height of the fiber wrapped portion of the mandrel and, $$E_m = \frac{1}{2}K_m(\delta h)^2, \text{ or, using (7), } E_m = \frac{2h^2 K_m}{D^2}(\delta D)^2 \quad (8)$$

where $K_m$=effective mandrel stiffness constant for a single mandrel.

Equating the two expressions for the potential energy, $E_m = E_f$, the effective mandrel stiffness constant can be cast as a function of the stiffness of one unit length of the fiber and the mandrel dimensions, or, $$K_m = \frac{N\pi D}{4h^2}(K_{in}) \quad (9)$$

This result can be exploited to generate an expression for the resonance frequency of the seismic sensor which consists of a mass supported by two mandrels as shown in the FIG. 1.

$$f_n = \frac{1}{2\pi}\sqrt{\frac{2K_m}{M}}, \text{ or, } f_n = \sqrt{\frac{NDK_{in}}{8\pi h^2 M}} \quad (10)$$

Considering the optical characteristics of the transducer of the Figure, the optical phase shift manifested by the interferometer is a function of the optical path length difference. The phase shift in one mandrel resulting from this path length difference is given by $$\delta\psi = \frac{2\pi\eta}{\lambda_0}\delta L \quad (11)$$

Where:
$\delta\psi$=optical phase shift
$\lambda_0$=light wavelength in vacuum
$\eta$=index of refraction of the fiber core
$\delta L$=total change in fiber length Using Eqs. (7) and (11), developed aboved, the theoretical optical phase shift as a function of mandrel height change can be written as, $$\frac{\delta\psi}{\delta h} = \frac{\eta\pi^2 ND}{\lambda_0 h} \quad (12)$$

The total phase shift in the seismometer is given when Eq. 12 is multiplied by a factor of four, two because of the Michelson configuration, and two because the mandrels operate in a push-pull fashion.

By combining Eqs. (11) and (12) we can express the optical sensitivity as an effective optical leverage, that is the ratio of the overall change in optical path length to the change in the position of the seismic mass, $$\frac{\delta L}{\delta h} = \frac{2\pi ND}{h} \quad (13)$$

For the sensors described herein this optical leverage is of order $10^3$.

Using the optical leverage, the sensitivity of the sensor when operating in the accelerometer limit can be modeled by using Hooke's Law, where the force/distance proportionality factor is $2K_m$, and Newton's Second where the force/acceleration proportionality factor is the seismic mass, to form the ratio between the total optical phase shift and the acceleration, $$\frac{\delta\psi}{\delta a_o} = \frac{8\pi\eta hM}{\lambda_0 K_{in}} \quad (14)$$

Measurements conducted under laboratory conditions confirm the above treated developmental discussion to a highly satisfactory degree. Such measurements are unnecessary for an understanding of the invention and do not contribute to the making or using of the invention and, accordingly are not included in this description.

Figure 2:
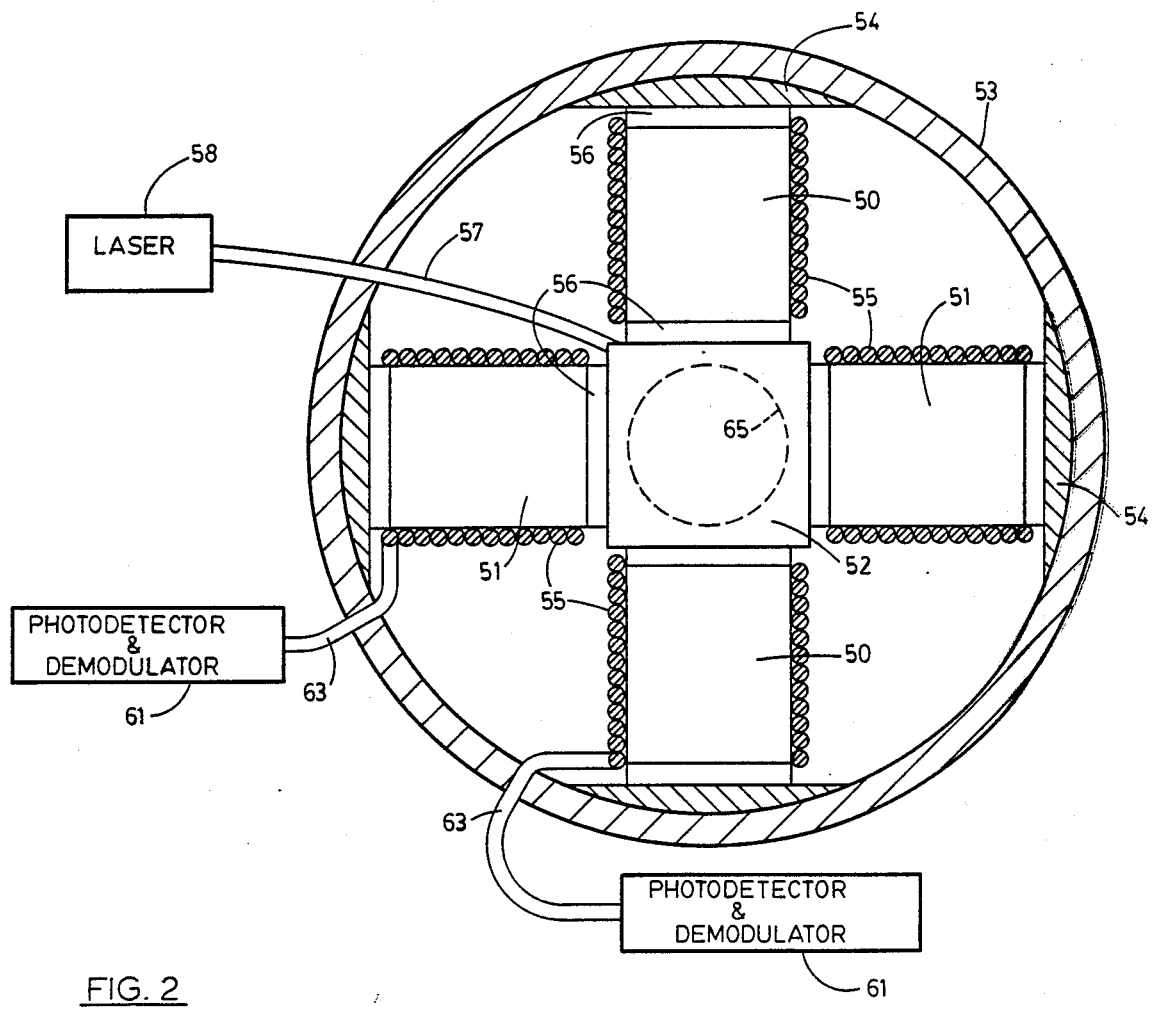
FIG. 2 is a multi-axis variation.

If desired, a plural axis device of the type described may be constructed by placement of plural pairs of wound mandrels orthogonally around the seismic mass. This arrangement is illustrated in FIG. 2 for three axis with one mandrel shown in broken lines.

The foregoing description details the materials and fabrication of the invention in all critical aspects. Good design and engineering practices, known to transducer artisans, taken in view of this disclosure will enable such a craftsman to make and use the invention.

What is claimed is:

1. A mechanical vibration sensor comprising:
   a seismic mass;
   a plurality of resilient supports connected to said seismic mass and spaced one from the other in predetermined angular orientation, said resilient supports being disposed in pairs with the supports of each pair spaced substantially on opposite sided of the seismic mass from one another and there being two such pairs orthogonally disposed so as to form a two-axis vibration sensor;
   a plurality of lengtengths of optical fiber equal in number to the number of resilient supports and wound individually thereabout; and
   an enclosure surrounding said seismic mass and said plurality of resilient supports and connected to each of said supports so as to support said seismic mass therebetween.

2. A mechanical vibration sensor comprising:
   a seismic mass;
   a plurality of resilient supports connected to said seismic mass and spaced one from the other in predetermined angular orientation, said resilient supports being disposed in pairs with the supports of each pair spaced substantially on opposite sides of the seismic mass from one another and there being three such pairs mutually orthogonally disposed so as to form a three-axis vibration sensor;

a plurality of lengths of optical fiber equal in number to the number of resilient supports and wound individually thereabout; and an enclosure surrounding said seismic mass and said plurality of resilient supports and connected to each of said supports so as to support said seismic mass therebetween.

3. A mechanical vibration sensor comprising:

a seismic mass;

an even-numbered plurality of at least four resilient supports connected to said seismic mass and spaced in predetermined angular relation, said resilient supports being disposed in pairs with such resilient supports of each pair disposed oppositely of said seismic mass;

a plurality of lengths of optical fiber equal in number to the number of resilient supports and wound individually thereabout; and an enclosure surrounding said seismic mass and said plurality of resilient supports and connected to each of said supports so as to support said seismic mass therebetween.

* * * * *